Oct. 25, 1932.                L. W. LESSLER                1,883,997
                TRIPOD SOCKET FOR CAMERAS AND THE LIKE
                        Filed March 12, 1931

INVENTOR.
LEW W. LESSLER.
BY
ATTORNEY.

Patented Oct. 25, 1932

1,883,997

UNITED STATES PATENT OFFICE

LEW W. LESSLER, OF JOHNSON CITY, NEW YORK, ASSIGNOR TO AGFA ANSCO CORPORATION, OF BINGHAMTON, NEW YORK, A CORPORATION OF NEW YORK

TRIPOD SOCKET FOR CAMERAS AND THE LIKE

Application filed March 12, 1931. Serial No. 522,005.

My invention relates to sockets such as are provided on cameras for mounting same on tripods when making composite group pictures or time exposures.

The foremost object of my invention is to provide a tripod socket which when assembled on the camera body will become well integrated therewith and which not only serves in its usual utility capacity but as well lends itself to the practical purpose of protectively securing the covering material thereof thereto and at the same time appreciably enhances the general appearance of the product.

Another feature of my invention lies in the provision of a socket comprised of two simple parts adapted to be easily and quickly assembled on the camera, thus greatly reducing the cost of this operation and thereby ultimately decreasing the final cost of the camera.

Other objects and advantages in details of construction and manner of application will be apparent as the description proceeds, reference now being had to the figures of the accompanying drawing, forming a part of this application and wherein like reference numerals indicate like parts.

In the drawing:

Figure 1 is a side elevational view of a folding camera in open position with my improved tripod sockets secured thereon and with one of same in mounted position on a tripod.

Figure 3:
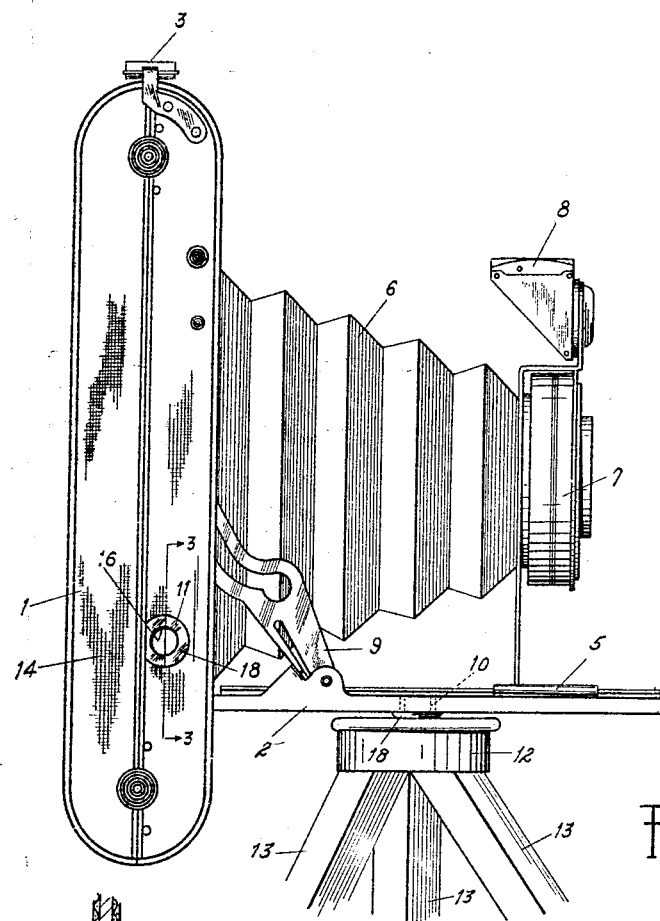
Figure 3 is a sectional view taken on the line 3—3 of Figure 1 showing in detail my improved socket as applied to the side of the camera.

While I have herein illustrated and will describe my invention as applied to the well known portable folding type of camera, it should be understood that it is equally adaptable for use on any of the other various types of photographic cameras.

The reference character 1 indicates the camera body having the usual platform 2 and other appurtenant parts such as the carrying strap 3, carriage 5, bellows 6, shutter 7, finder 8, and folding brackets 9.

The operation and function of these parts, is too well known to need further description, suffice it to say, that it is desirable and especially useful in a camera of this class to provide same with two tripod sockets, one on the platform thereof for holding the camera in position for taking vertical pictures, the other on one side thereof for holding the camera in position for taking landscapes, groups or other horizontal pictures. These sockets, are herein generally indicated at 10 and 11 respectively and with particular reference to Figure 1 it will be seen that the socket 10 of the platform 2 is in mounted position on the tripod standard 12 which is provided with the usual downwardly extending legs 13.

Covering material 14 such as leather, canvas, or other suitable fabric is as a rule applied to the outside of the casing 1 and platform 2 thereof as by gluing, cementing or otherwise suitably securing same.

Figure 2:
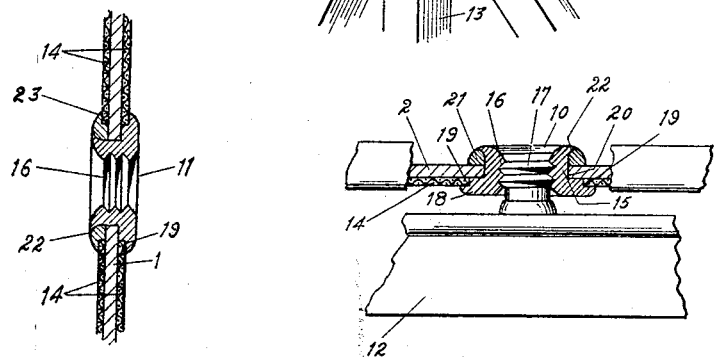
Figure 2 is a detail sectional view of my improved socket as applied to the platform of the camera.

Referring now to Figure 2 it will be seen that stem or shank 15 of the socket 10 is cast, or tooled of suitable material and embodies a relatively small circular piece having an opening provided centrally therein, said opening being threaded as at 16 with a standard tap of a size precisely that of the usual upstanding screw stud 17 of the tripod 12 and is adapted to threadably engage therewith. The lower portion of this shank 15 is provided with a flange 18 of a substantially larger diameter than the shank 15. The flange 18 is provided peripherally on the upper side thereof with an annular recess 19 of depth substantially the thickness of the covering material 14 whereby when the shank 15 of the socket is passed upwardly through a hole 19 provided in the platform therefor, the recessed flange 18 will completely overlie and protectively secure the edge of the similar opening cut in the covering material to permit passage of the socket therethrough. The upper edge of the shank 15 is scarfed, ground or otherwise suitably formed with a thin tapered knife-like edge extending upwardly beyond the upper surface of the platform 2 and is adapted to be turned or spun over a ring 21 placed thereon as at 22 thus rigidly securing these parts in assembled relation.

It should be particularly noted that the tapered edge of the shank 15 is turned very tightly over the ring 21 so that the joining of these two parts is hardly perceptible and markedly simulates therefore, a solid ring. The outer edge of the flange 18 is rounded to meet the fabric 14 or other covering material used, thus lending a decidedly finished and smooth appearance to the assembled socket.

The merits of such construction are obvious and more especially does this improved socket give evidence of superiority when used in connection with a fabric covering wherein the loose thread ends caused by cutting an opening therein are completely covered, thus precluding any possibility of their becoming unravelled or dishevelled.

In covering cameras it is sometimes deemed advisable to draw the covering material of the sides thereof over the front edge of said sides and fold same inwardly over a portion of the inner surfaces thereof. In such cases, to prevent the aforementioned unsightly appearance of frayed edges where the fabric is cut for mounting a tripod socket, I have provided the ring 21 with an annular recess 23 along the periphery of the inner surface thereof as clearly shown in Figure 3, in order to protect the fabric on the interior of the camera. Aside from this change, the tripod socket 11 on the side of the camera is substantially the same as the previously described socket 10 of the platform and does not, therefore, require further description.

Of course changes may be made in details of construction and arrangement of parts without departing from the spirit and scope of my invention. I do not limit myself, therefore, to the exact form herein shown and described other than by the appended claims.

I claim:

1. A tripod socket comprising a hollow stem having a flange at one end and being tapered at the other end, said flange being provided with an annular recess on the inner surface around the periphery thereof, a ring member adapted to cooperatively co-act with said tapered end of said stem and said stem being threaded interiorly thereof.

2. A tripod socket comprising a hollow stem having a flange at one end and being tapered at the other end, said flange being provided with an annular recess on the inner surface around the periphery thereof, a ring member adapted to cooperatively co-act with said tapered end of said stem and said stem being threaded interiorly thereof, said ring member being provided with an annular recess on the inner surface around the periphery thereof.

In testimony whereof, I affix my signature.

LEW W. LESSLER.